United States Patent
Ragazzi

(10) Patent No.: US 10,190,812 B2
(45) Date of Patent: Jan. 29, 2019

(54) METHOD AND SYSTEM FOR REDUCING THE POSSIBILITY OF VEHICLE HEAT EXCHANGER FREEZING

(71) Applicant: Ford Global Technologies, LLC, Dearborn, MI (US)

(72) Inventor: Franco Ragazzi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 872 days.

(21) Appl. No.: 14/185,619

(22) Filed: Feb. 20, 2014

(65) Prior Publication Data

US 2015/0233627 A1 Aug. 20, 2015

(51) Int. Cl.
  *F25D 21/00* (2006.01)
  *B60H 1/00* (2006.01)
  *F25D 21/04* (2006.01)

(52) U.S. Cl.
  CPC ......... *F25D 21/04* (2013.01); *B60H 1/00457* (2013.01); *B60H 1/00921* (2013.01)

(58) Field of Classification Search
  CPC ... F25D 21/04; F25D 21/004; B60H 1/00457; B60H 1/321; B60H 1/3208
  See application file for complete search history.

(56) References Cited

U.S. PATENT DOCUMENTS

| | | | | |
|---|---|---|---|---|
| 3,226,943 A * | 1/1966 | Mitchell | ............... | B60H 1/3205 62/227 |
| 3,924,417 A * | 12/1975 | Heidorn | ................ | F25B 41/043 62/158 |
| 5,586,448 A * | 12/1996 | Ikeda | ................ | B60H 1/00392 62/156 |
| 5,782,102 A * | 7/1998 | Iritani | ................ | B60H 1/00021 62/197 |
| 6,467,282 B1 * | 10/2002 | French | ................ | F25D 21/006 62/140 |
| 2002/0157414 A1 * | 10/2002 | Iwanami | ............ | B60H 1/00778 62/239 |
| 2002/0195090 A1 * | 12/2002 | Marsh | ..................... | F01P 7/165 123/563 |
| 2003/0205363 A1 * | 11/2003 | Chu | .................... | F28D 15/0266 165/80.3 |

(Continued)

FOREIGN PATENT DOCUMENTS

| | | |
|---|---|---|
| CN | 1119252 A | 3/1996 |
| DE | 102007030954 A1 | 1/2008 |

(Continued)

OTHER PUBLICATIONS

Anonymous, "Carbon Canister With Internal Peltier Devices to Improve Hydrocarbon Desorption," IPCOM No. 000240795, Published Mar. 3, 2015, 2 pages.

(Continued)

*Primary Examiner* — Kun Kai Ma
(74) *Attorney, Agent, or Firm* — David Kelley; McCoy Russell LLP

(57) ABSTRACT

Methods and systems for reducing the possibility of heat pump evaporator fin freezing are described. Evaporator fin temperature is compared to a threshold temperature that varies with vehicle operating conditions. Actions to mitigate evaporator fin freezing may be taken if evaporator fin temperature is less than the threshold temperature.

17 Claims, 4 Drawing Sheets

(56) References Cited

U.S. PATENT DOCUMENTS

| | | | |
|---|---|---|---|
| 2006/0095178 A1* | 5/2006 | Guilfoyle | B60K 11/085 701/36 |
| 2006/0102399 A1* | 5/2006 | Guilfoyle | B60K 11/04 180/68.1 |
| 2008/0202722 A1 | 8/2008 | Feuerecker et al. | |
| 2011/0109157 A1 | 5/2011 | Tani | |
| 2011/0113800 A1* | 5/2011 | Sekiya | B60H 1/00278 62/151 |
| 2011/0132292 A1* | 6/2011 | Schwartz | F01P 7/048 123/41.12 |
| 2011/0137530 A1* | 6/2011 | Kerns | F01P 7/10 701/49 |
| 2011/0281515 A1* | 11/2011 | Lockwood | F01P 7/12 454/75 |
| 2011/0288717 A1* | 11/2011 | Yu | B60K 11/085 701/31.4 |
| 2012/0011869 A1* | 1/2012 | Kondo | B60H 1/2225 62/176.5 |
| 2012/0100791 A1* | 4/2012 | Charnesky | F01P 7/10 454/75 |
| 2012/0179329 A1 | 7/2012 | Okamoto et al. | |
| 2013/0046445 A1* | 2/2013 | Nishimura | B60H 1/3208 701/49 |
| 2013/0086839 A1* | 4/2013 | Klop | B60K 11/085 49/1 |
| 2013/0338870 A1* | 12/2013 | Farmer | B60K 11/085 701/29.2 |
| 2014/0039765 A1* | 2/2014 | Charnesky | F01P 7/10 701/49 |
| 2014/0110488 A1* | 4/2014 | Surnilla | F02B 29/04 236/49.1 |
| 2014/0120820 A1* | 5/2014 | Glugla | F01P 7/048 454/75 |
| 2014/0298838 A1* | 10/2014 | Morishita | B60H 1/321 62/151 |
| 2015/0191078 A1* | 7/2015 | Miyaji | F01P 7/12 701/49 |
| 2015/0338173 A1* | 11/2015 | Katoh | F28F 9/0278 165/172 |

FOREIGN PATENT DOCUMENTS

| | | |
|---|---|---|
| DE | 102011051285 A1 | 12/2012 |
| EP | 2636548 A1 | 9/2013 |

OTHER PUBLICATIONS

Anonymous, "Temperature-based Fuel Cell Freeze Protection via Electric Heater," IPCOM No. 000028929, Published Jun. 8, 2004, 2 pages.

Smith, Mark G. et al., "Climate Control System," U.S. Appl. No. 14/010,057, filed Aug. 26, 2013, 14 pages.

* cited by examiner

METHOD AND SYSTEM FOR REDUCING THE POSSIBILITY OF VEHICLE HEAT EXCHANGER FREEZING

FIELD

The present description relates to methods and systems for reducing the possibility of vehicle heat exchanger freezing. The methods and systems may be particularly useful for vehicles that experience a wide variety of operating conditions over a drive cycle.

BACKGROUND AND SUMMARY

A passenger vehicle may include a heat pump for cooling and/or heating the vehicle's cabin. The heat pump may include an outside heat exchanger that acts as an evaporator during passenger cabin heating and as a condenser during passenger cabin cooling. However, during passenger cabin heating, evaporator fins may experience freezing or icing. If the fins freeze and ice forms on the fins, the heat pump heating efficiency may be reduced. Consequently, it may be desirable to determine if evaporator fins may be freezing. However, evaporator fins may freeze differently during different operating conditions. For example, during one operating condition, the evaporator fins may begin to freeze in response to a first condition, and during a second operating condition, the fins may begin to freeze in response to a second condition. Therefore, it may be a challenge to determine when the evaporator fins will begin to freeze so that mitigating actions may be taken.

The inventor herein has recognized the above-mentioned disadvantages for operating an evaporator and has developed a method for operating a vehicle climate control system, comprising: adjusting a temperature threshold in response to a position of grille shutters; judging whether or not evaporator fins are expected to freeze in response to the position of grille shutters; and performing an action to reduce a possibility of the evaporator fins freezing.

By performing an action in response to a comparison of evaporator fin temperature and a temperature threshold that varies with vehicle operating conditions, it may be possible to provide the technical result of reducing the possibility of evaporator fin freezing. The action may include adjusting a position of grille shutters, adjusting expansion valve state, entering a different heat pump operating mode, or other mitigating action. In this way, different vehicle conditions may be incorporated into a way of determining the possibility of evaporator fin freezing so that evaporator fin freezing may be avoided.

The present description may provide several advantages. Specifically, the approach may improve heat pump efficiency during some operating conditions. Further, the approach may reduce the possibility of evaporator fin freezing. Additionally, the approach may improve passenger comfort in a vehicle's passenger cabin.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to reducing the possibility of outside evaporator freezing. The outside evaporator may be included in an electric vehicle, hybrid vehicle, or a vehicle that is propelled solely via an internal combustion engine. In one example, the vehicle may include the systems shown in FIGS. 1 and 2. The systems may perform as shown in the operating sequence of FIG. 3 according to the method of FIG. 4. The vehicle may be a passenger vehicle as is shown in FIG. 1 or a commercial vehicle (not shown).

Figure 1:
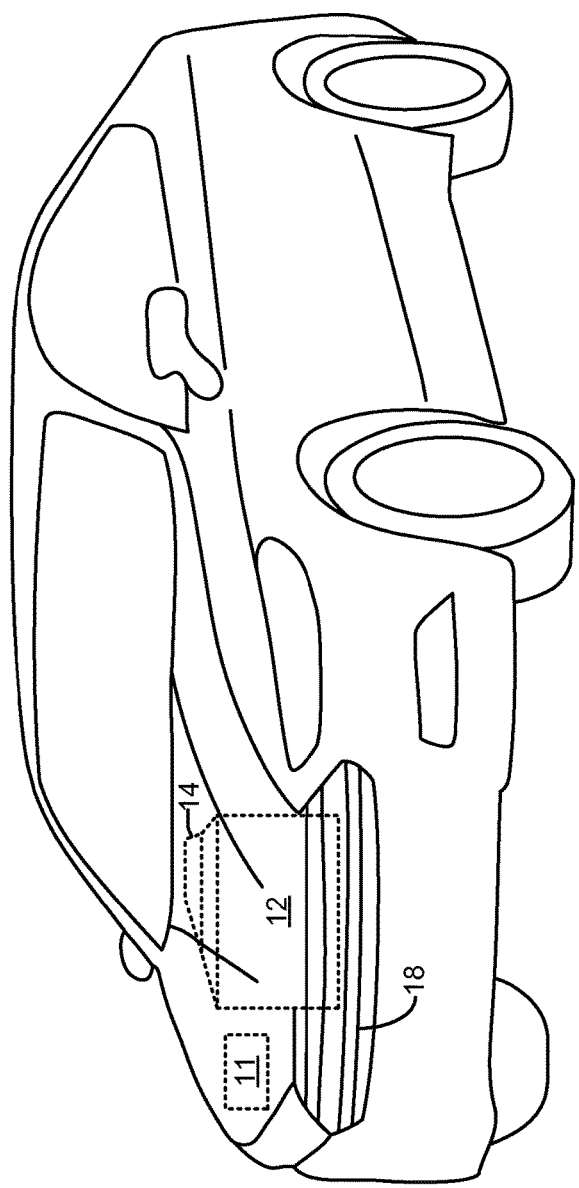
FIG. 1 is a schematic diagram of a vehicle.

Referring to FIG. 1, a vehicle 10 including an engine 12, an electrical machine 14, and an electrical energy storage device 11 is shown. In one example, the vehicle may be propelled solely via the engine 12, solely via an electrical machine 14, or by both the engine 12 and the electrical machine 14. The electrical machine 14 may be supplied electrical power via the electrical energy storage device 11. The electrical energy storage device 11 may be recharged via the vehicle's kinetic energy or via engine 12 providing power to electrical machine 14. The electric machine 14 may convert the vehicle's kinetic energy or engine torque into electrical energy which is stored in electric energy storage device 11. Electrical energy storage device 11 may also be recharged from a stationary power grid via a home charging system or a remote charging system (e.g., a charging station). In one example, electrical energy storage device 11 is a battery. Alternatively, electrical energy storage device 11 may be a capacitor or other storage device.

Vehicle 10 is shown with internal combustion engine 12, and it may be selectively coupled to an electric machine 14. Internal combustion engine 12 may combust petrol, diesel, alcohol, hydrogen, or a combination of fuels. Vehicle 10 also includes grille shutters 18 for improving vehicle aerodynamics and efficiency. Grille shutters 18 may be fully closed, fully open, or partially open. In one example, the position of grille shutters 18 is based on engine cooling system temperature, vehicle speed, cabin temperature, and other vehicle operating conditions. Grille shutters may be selectively opened to increase engine and passenger cabin cooling. Grille shutters may be selectively closed to improve vehicle aerodynamics and increase passenger cabin heating.

Figure 2:
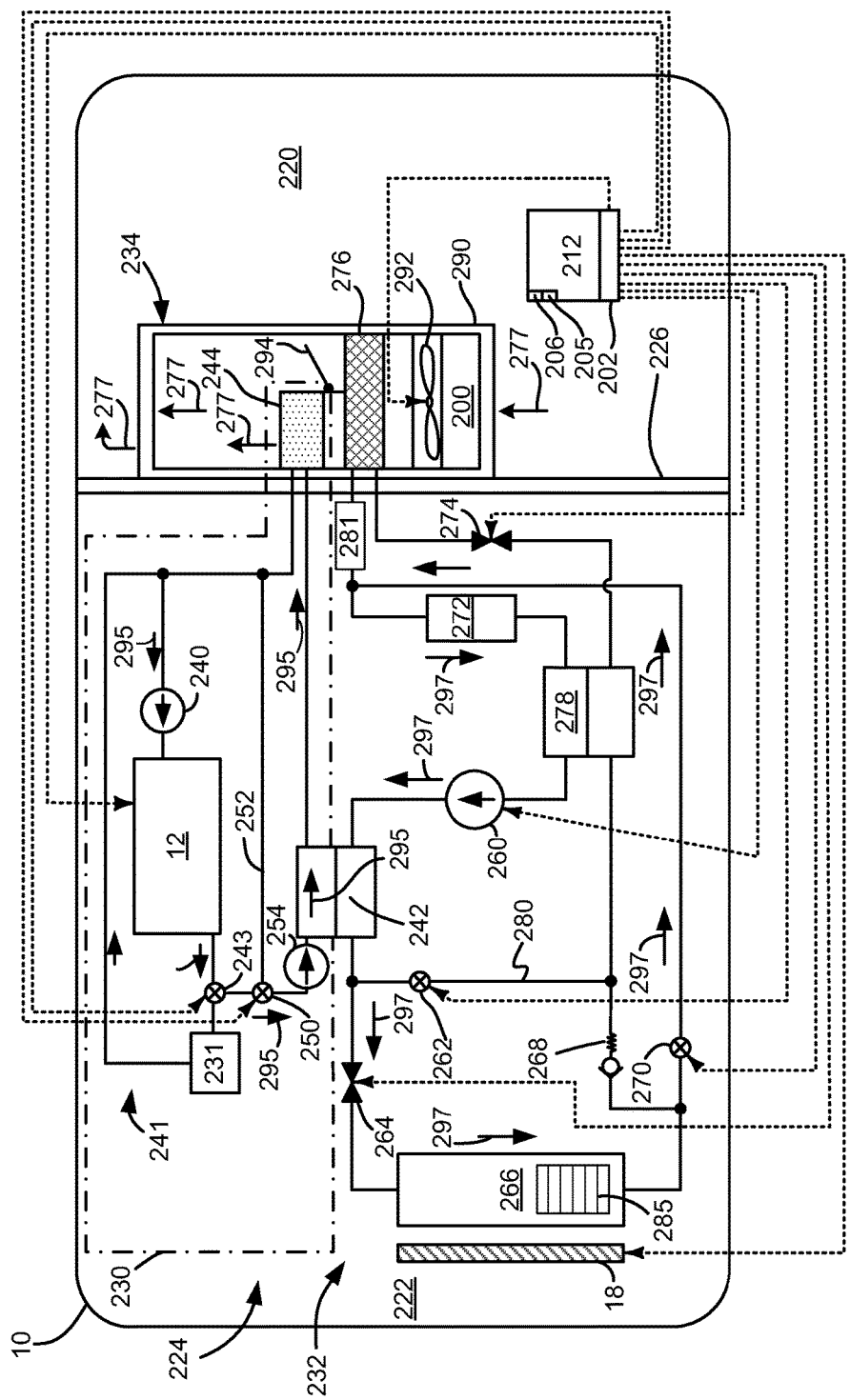
FIG. 2 shows an example vehicle climate control system operating in a heating mode.

Referring now to FIG. 2, a vehicle climate control system 224 is shown in a passenger cabin heating mode. Devices and fluidic passages or conduits are shown as solid lines. Electrical connections are shown as dashed lines. The vehicle climate control system 224 may be included in vehicle 10 shown in FIG. 1, and the vehicle climate control system 224 may operate according to the method of FIG. 4.

The vehicle 10 may include a passenger compartment 220, an engine compartment 222, and a climate control system 224. The passenger compartment 220 may be within vehicle 10 and it may receive one or more occupants. A portion of climate control system 224 may be positioned in passenger compartment 220.

Engine compartment 222 may be positioned proximate to passenger compartment 220. One or more power sources, such as internal combustion engine 12, as well as a portion of climate control system 224 may be within engine compartment 222. Engine compartment 222 may be isolated from the passenger compartment 220 via bulkhead 226. The climate control system 224 may circulate air and/or control or modify the temperature of air that is circulated in the passenger compartment 220. Further, the internal combustion engine 12 may be heated via climate control system 224 to reduce fuel consumption and emissions. The climate control system 224 may include a coolant subsystem 230, a heat pump subsystem 232, and a ventilation subsystem 234.

Coolant subsystem 230 includes a coolant loop 241 including internal combustion engine 12, engine radiator 231, pump 240, thermostat valve 243, intermediate refrigerant to engine coolant heat exchanger 242, and heater core 244. Coolant such as water or glycol may flow through the coolant loop 241. Pump 240 delivers coolant to engine 12. Coolant passes through engine 12 and may move to intermediate refrigerant to engine coolant heat exchanger 242 and/or engine radiator 231 depending on the state of thermostat 243. If engine 12 is cold, engine coolant is delivered solely to intermediate refrigerant to engine coolant heat exchanger 242. If engine 12 is warm, engine coolant may be delivered to engine radiator 231 and/or intermediate refrigerant to engine coolant heat exchanger 242 as indicated by flow direction arrows 295. Coolant supplied to radiator 231 is returned to pump 240. Coolant supplied to intermediate refrigerant to engine coolant heat exchanger 242 is directed to heater core 244 before being returned to pump 240.

Coolant subsystem 230 may also include bypass loop control valve 250 and bypass line 252. The bypass line 252 may route coolant such that the coolant is not heated by the internal combustion engine 12. More specifically, the bypass loop control valve 250 may permit coolant to flow through a bypass line 252 and inhibit the flow of coolant from internal combustion engine 12 to the intermediate heat exchanger 242 when in a first position. In such a position, a second coolant pump 254 may circulate coolant through the intermediate heat exchanger 242 to the heater core 244 to the bypass line 252 and back to the second coolant pump 254.

Waste heat generated by internal combustion engine 12 when the engine is running or combusting air and fuel may be transferred to the coolant. The coolant may be circulated through engine radiator 231 to cool internal combustion engine 12. Engine coolant may also be directed to heater core 244 for heating passenger cabin 220 as indicated by arrows 295. Heat may also be transferred from heat pump subsystem 232 to coolant in the coolant loop 241 via intermediate refrigerant to engine coolant heat exchanger 242 when climate control system 224 is in a passenger cabin heating mode. Heat pump subsystem 232 transfers heat from outside evaporator 266 via intermediate refrigerant to engine coolant heat exchanger 242 when climate control system 224 is in a passenger cabin heating mode.

The intermediate refrigerant to engine coolant heat exchanger 242 may facilitate the transfer of thermal energy between the coolant subsystem 230 and the heat pump subsystem 232. In particular, heat may be transferred from heat pump subsystem 232 to coolant subsystem 230 for heating passenger cabin 220 via heater core 244 or engine 12 when engine 12 is cold. The intermediate refrigerant to engine coolant heat exchanger 242 may be part of the coolant subsystem 230 and the heat pump subsystem 232. The intermediate refrigerant to engine coolant heat exchanger 242 may have any suitable configuration. For example, the intermediate refrigerant to engine coolant heat exchanger 242 may have a plate-fin, tube-fin, or tube-and-shell configuration that may facilitate the transfer of thermal energy from heat pump subsystem 232 to coolant subsystem 230 without mixing or exchanging the heat transfer fluids in the coolant subsystem 230 and heat pump subsystems 232.

Heat may be transferred from the heat pump subsystem 232 to the coolant via the intermediate refrigerant to engine coolant heat exchanger 242. During a passenger cabin heating mode, intermediate refrigerant to engine coolant heat exchanger 242 transfers heat from heat pump subsystem 232 to coolant loop 241 to heat passenger cabin 220 via heater core 244.

The heater core 244 may transfer thermal energy from the coolant to air in the passenger compartment 220. The heater core 244 may be positioned in the passenger compartment 220 in the ventilation subsystem 234 and may have any suitable configuration. For example, the heater core 244 may have a plate-fin or tube-fin construction in one or more examples.

The heat pump subsystem 232 may transfer thermal energy to or from the passenger compartment 220 and to or from the coolant subsystem 230. In at least one example, the heat pump subsystem 232 may be configured as a vapor compression heat pump subsystem 232 in which a fluid is circulated through the vapor compression heat pump subsystem 232 to transfer thermal energy to or from the passenger compartment 220. The heat pump subsystem 232 may operate in various modes, including, but not limited to a cooling mode and a heating mode. In the cooling mode, the heat pump subsystem 232 may circulate a heat transfer fluid, which may be called a refrigerant, to transfer thermal energy from inside the passenger compartment 220 to outside the passenger compartment 220. In a heating mode, the heat pump subsystem 232 may transfer thermal energy from the refrigerant in the heat pump subsystem 232 to the coolant in the coolant subsystem 224 via the intermediate refrigerant to engine coolant heat exchanger 242 without circulating the refrigerant through a heat exchanger in the passenger compartment 220.

Heat pump subsystem 232 may include a pump 260, a first control valve 262, a first expansion device 264, an exterior heat exchanger 266 (e.g., a heat exchanger exterior relative to passenger cabin 220) including fins 285, a check valve 268, a third control valve 270, a pressure regulator 281, an accumulator 272, a second expansion device 274, an interior heat exchanger 276, an exterior heat exchanger bypass passage 280, and an optional internal heat exchanger 278. Components of the heat pump subsystem 232 may be in fluidic communication via one or more conduits, such as a tube, hose or the like. In FIG. 2, the refrigerant circulation path when heat pump subsystem 232 is operated in the heating mode is represented by the arrowed lines 297.

The pump 260, which may also be called a compressor, may pressurize and circulate the refrigerant through the heat pump subsystem 232. The pump 260 may be powered by an electrical or non-electrical power source. For example, the pump 260 may be operatively coupled to internal combustion engine 12 or driven by an electrically powered motor. In a passenger cabin heating mode, the pump 260 may provide high pressure refrigerant to the intermediate refrigerant to coolant heat exchanger 242, which in turn may transfer heat from the high pressure refrigerant to coolant passing through the intermediate refrigerant to coolant heat exchanger 242 to heat coolant flowing in coolant subsystem 230.

The first control valve 262 is shown positioned along a bypass path 280, which is positioned between the intermediate heat exchanger 242 and the first expansion device 264. The bypass path 280 may permit flowing refrigerant to bypass the first expansion device 264 and the exterior heat exchanger 266 and flow to the internal heat exchanger 278 (if provided), the second expansion device 274, and the interior heat exchanger 276 when the first control valve 262 is open during a passenger cabin parallel dehumidification mode. The first control valve 262 may be closed to inhibit the flow of refrigerant through the bypass path 280 to the interior heat exchanger 276 when the heat pump subsystem 232 is in the passenger cabin heating mode.

The first expansion device 264 is shown positioned between and may be in fluidic communication with intermediate refrigerant to coolant heat exchanger 242 and the exterior heat exchanger 266. The first expansion device 264 may be provided to change the pressure of the refrigerant. For example, the first expansion device 264 may be a thermal expansion valve (TXV) or a fixed or variable position valve (e.g., an electrically controlled expansion valve) that may or may not be externally controlled. The first expansion device 264 may reduce the pressure of the refrigerant that passes through the first expansion device 264 from the intermediate heat exchanger 242 to the exterior heat exchanger 266. Therefore, high pressure refrigerant received from the intermediate heat exchanger 242 may exit the first expansion device 264 at a lower pressure and as a liquid and vapor mixture in the passenger cabin heating mode.

The exterior heat exchanger 266 may be positioned outside the passenger compartment 220. In a heating mode, the exterior heat exchanger 266 may operate as an evaporator and may transfer heat from the ambient surrounding environment to the refrigerant, thereby causing the refrigerant to vaporize. Grille shutters 18 may be selectively opened and closed in response to vehicle operating conditions. In one example, grille shutters 18 may be closed to retain heat within the engine compartment 222, thereby reducing the possibility of freezing of fins 285.

The check valve 268 may be positioned between the exterior heat exchanger 266 and the bypass path 280. The check valve 268 may inhibit the flow of refrigerant from the bypass path 280 to the exterior heat exchanger 266. As such, refrigerant exiting the exterior heat exchanger 266 when the climate control system 224 is in the passenger cabin heating mode may be routed to the second control valve 270.

A second control valve 270 may be positioned between the exterior heat exchanger 266 and the accumulator 272. The second control valve 270 may help control the flow of refrigerant that exits the exterior heat exchanger 266. In the passenger cabin heating mode, the second control valve 270 may be open to permit refrigerant to flow from the exterior heat exchanger 266 to the accumulator 272.

The accumulator 272 may act as a reservoir for storing any residual liquid refrigerant so that vapor refrigerant, rather than liquid refrigerant, may be provided to the pump 260. The accumulator 272 may include a desiccant that absorbs small amounts of water moisture from the refrigerant.

The second expansion device 274 may be positioned between and may be in fluidic communication to the exterior heat exchanger 266 and the interior heat exchanger 276. The second expansion device 274 may have a similar structure as the first expansion device 264 and may be provided to change the pressure of the refrigerant similar to the first expansion device 264. In addition, the second expansion device 274 may be closed to inhibit the flow of refrigerant. More specifically, the second expansion device 274 may be closed to inhibit the flow of refrigerant from the exterior heat exchanger 266 to the interior heat exchanger 276 in the passenger cabin heating mode. As such, closing the second expansion device 274 may inhibit the flow of refrigerant through check valve 268 to the internal heat exchanger 278 (if provided), as well as through the interior heat exchanger 276.

The interior heat exchanger 276 may be in fluidic communication with the second expansion device 274. The interior heat exchanger 276 may be positioned inside the passenger compartment 220. In the passenger cabin heating mode, refrigerant may not be routed to the interior heat exchanger 276 due to the closure of the second expansion device 274.

The internal heat exchanger 278, if provided, may transfer thermal energy between refrigerant flowing through different regions of the heat pump subsystem 232. The internal heat exchanger 278 may be positioned outside the passenger compartment 220. In the passenger cabin heating mode, the internal heat exchanger 278 does not transfer thermal energy between such refrigerant flow paths since the second expansion device 274 is closed, thereby inhibiting the flow of refrigerant through a portion of the internal heat exchanger 278.

The ventilation subsystem 234 may circulate air in the passenger compartment 220 of the vehicle 10. The ventilation subsystem 234 may have a housing 290, a blower 292, and a temperature door 294.

The housing 290 may receive components of the ventilation subsystem 234. In FIG. 2, the housing 290 is illustrated such that internal components are visible rather than hidden for clarity. In addition, airflow through the housing 290 and internal components is represented by the arrowed lines 277. The housing 290 may be at least partially positioned in the passenger compartment 220. For example, the housing 290 or a portion thereof may be positioned under an instrument panel of the vehicle 10. The housing 290 may have an air intake portion 200 that may receive air from outside the vehicle 10 and/or air from inside the passenger compartment 220. For example, the air intake portion 200 may receive ambient air from outside the vehicle 10 via an intake passage, duct, or opening that may be located in any suitable location, such as proximate a cowl, wheel well, or other vehicle body panel. The air intake portion 200 may also receive air from inside the passenger compartment 220 and recirculate such air through the ventilation subsystem 234. One or more doors or louvers may be provided to permit or inhibit air recirculation.

The blower 292 may be positioned in the housing 290. The blower 292, which may also be called a blower fan, may be positioned near the air intake portion 200 and may be configured as a centrifugal fan that may circulate air through the ventilation subsystem 234.

The temperature door 294 may be positioned between the interior heat exchanger 276 and the heater core 244. In the example shown, the temperature door 294 is positioned downstream of the interior heat exchanger 276 and upstream of the heater core 244. The temperature door 294 may block or permit airflow through the heater core 244 to help control the temperature of air in the passenger compartment 220. For example, the temperature door 294 may permit airflow through the heater core 244 in the heating mode such that heat may be transferred from the coolant to air passing through the heater core 244. This heated air may then be provided to a plenum for distribution to ducts and vents or outlets located in the passenger compartment 220. The temperature door 294 may be moved between a plurality of positions to provide air having a desired temperature. In FIG. 2, the temperature door 294 is shown in a full heat position in which airflow is directed through the heater core 244.

Figure 4:
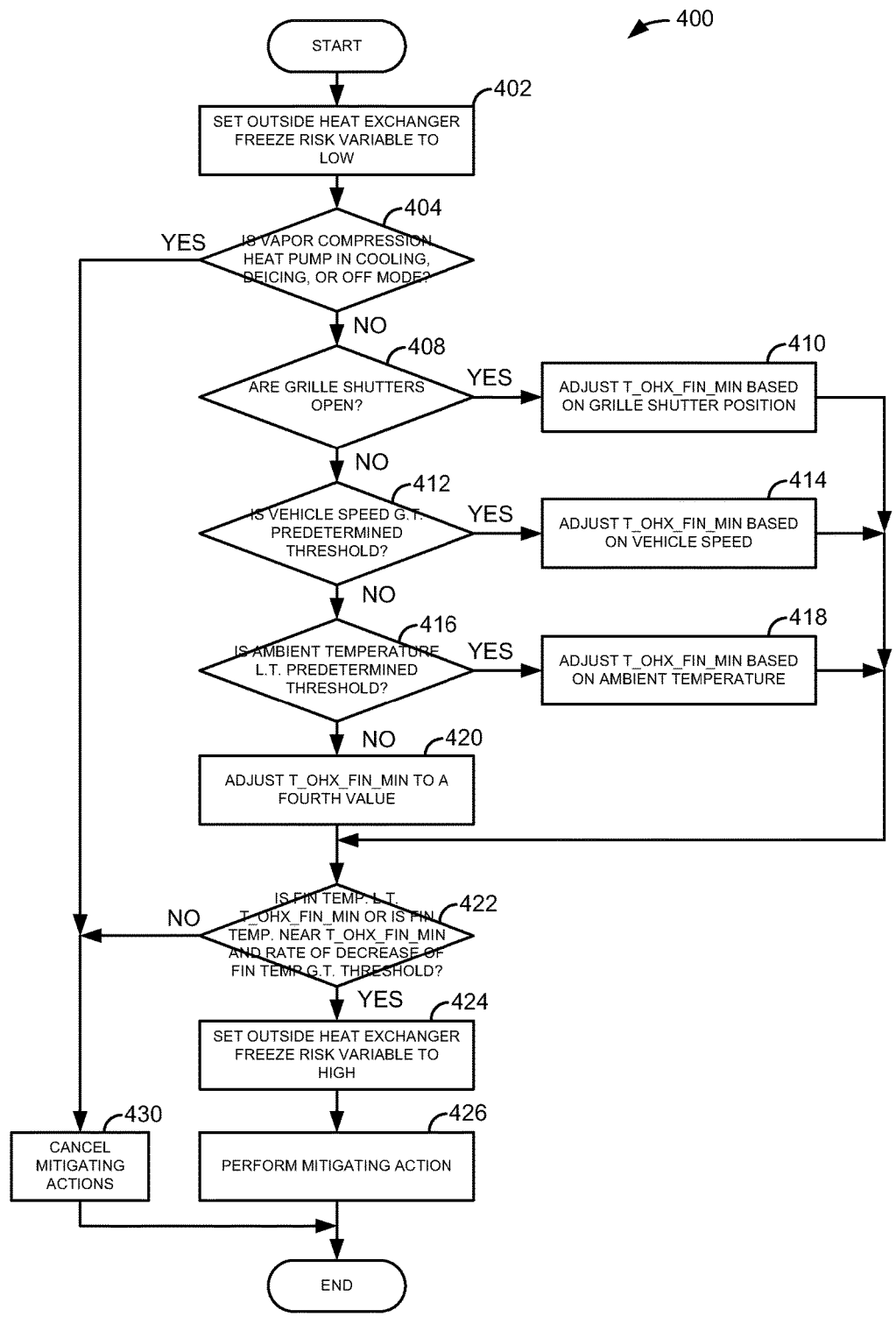
FIG. 4 shows a method for operating a vehicle climate control system.

Controller 212 includes executable instructions of the method in FIG. 4 to operate the valves, fans, and pumps or compressors of the system shown in FIG. 2. Controller 212 includes inputs and outputs 202 to interface with devices in the system of FIG. 2. Controller 212 also includes a central processing unit 205 and non-transitory memory 206 for executing the method of FIG. 4.

The system of FIG. 2 may also be operated in a de-ice mode. During de-ice mode first expansion device 264 may be adjusted (e.g., fully opened) so that a small pressure drop occurs across first expansion device 264. Further, second expansion device 274 is closed so that refrigerant does not pass through interior heat exchanger 276 and valve 262 is also closed. Compressor 260 increases temperature of refrigerant as it compresses the refrigerant. The heated refrigerant is directed through exterior heat exchanger 266, thereby warming exterior heat exchanger 266 to de-ice coils. The heated refrigerant is returned to compressor 260 after the refrigerant flows through accumulator 272 and internal heat exchanger 278. Additionally, coolant pump 254 is deactivated in de-icing mode so that heat in the refrigerant is not transferred to coolant loop 241.

The system of FIG. 2 may also be operated in a series passenger cabin dehumidification mode. During series passenger cabin dehumidification mode, first expansion device 264 is opened to allow refrigerant to flow to external heat exchanger 266, which acts as an evaporator, and first control valve 262 is closed to prevent refrigerant from flowing from intermediate refrigerant and to coolant heat exchanger 242 to interior heat exchanger 278. The compressed refrigerant passes through external heat exchanger 266 and check valve 268 before reaching second expansion device 274. Second expansion device 274 is adjusted to provide a small pressure drop, thereby limiting the cooling of interior heat exchanger 276. By providing only a small pressure drop across second expansion device 274, moisture in passenger cabin 220 may be condensed without substantially cooling the cabin air. Refrigerant leaves second expansion device 274 to enter interior heat exchanger 276. The refrigerant is returned to compressor 260 from heat exchanger 276 after it passes through pressure regulator 280 and accumulator 272.

The system of FIG. 2 may also be operated in a parallel passenger cabin dehumidification mode. During parallel passenger cabin dehumidification mode, first control valve 262, and second control valve 270 are opened to allow refrigerant to flow through external heat exchanger 266 and bypass 280. Further, the first expansion device 264 is open and it regulates refrigerant flow into the external heat exchanger 266. Refrigerant output from external heat exchanger 266 is directed to accumulator 272. Refrigerant passing through bypass passage 280 is directed through second expansion device 274 and interior heat exchanger 276. Operating the heat pump subsystem 232 in a parallel dehumidification mode allows cabin dehumidification at lower ambient air temperatures. The refrigerant pressure in the external heat exchanger 266 is allowed to drop without causing very low refrigerant pressures in the interior heat exchanger 276, thereby decreasing the risk of ice forming on the coils of internal heat exchanger 276.

Thus, the system of FIGS. 1 and 2 provides for a vehicle system, comprising: an evaporator including evaporator fins; a compressor in fluidic communication with the evaporator; a condenser in fluidic communication with the evaporator and the compressor; and a controller including executable instructions stored in non-transitory memory for adjusting a temperature threshold based on grille shutter position, and instructions to perform an action to reduce a possibility of evaporator fin freezing in response to the temperature threshold. The vehicle system further comprises grille shutters and additional instructions for closing the grille shutters in response to a temperature of the evaporator fins being less than the temperature threshold. The vehicle system further comprises additional instructions for performing the action in response to a temperature of evaporator fins being within a predetermined temperature of the threshold temperature and a rate of change of the temperature of evaporator fins exceeding a threshold rate of change. The vehicle system includes additional instructions to adjust the temperature threshold in response to ambient temperature. The vehicle system further comprises additional instructions to adjust grille shutter position in response to a comparison of evaporator fin temperature and the temperature threshold. The vehicle system further comprises additional instructions to adjust an operating state of an expansion valve, the expansion valve in fluidic communication with the evaporator.

Figure 3:
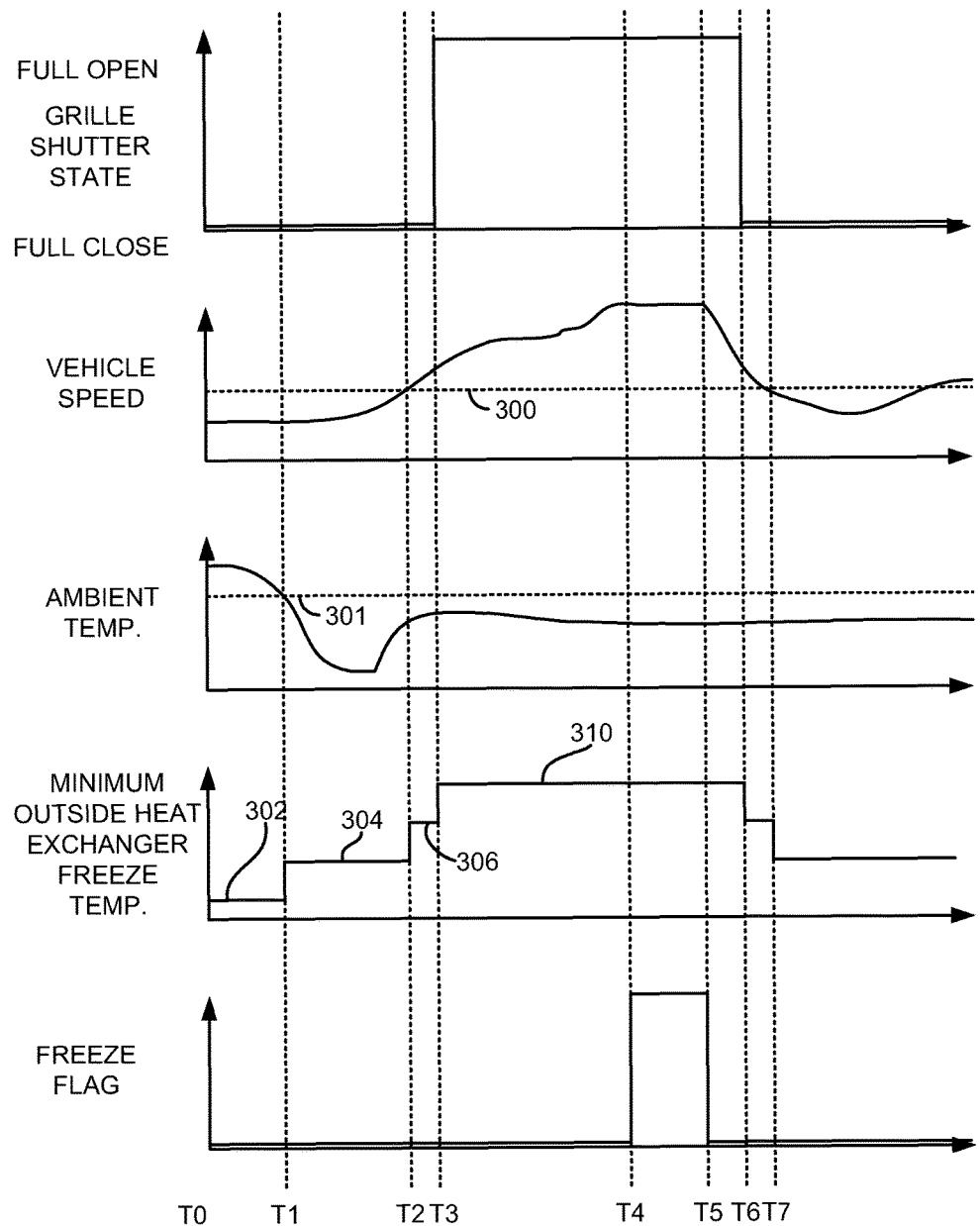
FIG. 3 shows an example vehicle climate control system operating sequence.

Referring now to FIG. 3, a sequence of operating a vehicle climate control system according to the method of FIG. 4 is shown. The sequence of FIG. 3 provides an example of adjusting a threshold temperature that is the basis for determining whether or not the possibility of outside evaporator fin freezing is present. Vertical lines at T0-T7 represent times of particular interest in the sequence.

The first plot from the top of FIG. 3 is a plot of grille shutter position versus time. The Y axis represents grille shutter position and the grille shutters are fully open when the grille shutter trace is near the Y axis arrow. The grille shutters are fully closed when the grille shutter trace is near the X axis. The X axis represents time and time increases from the left side of FIG. 3 to the right side of FIG. 3.

The second plot from the top of FIG. 3 is a plot of vehicle speed versus time. The Y axis represents vehicle speed and vehicle speed increases in the direction of the Y axis arrow. The X axis represents time and time increases from the left side of FIG. 3 to the right side of FIG. 3. Horizontal line 300 represents a threshold vehicle speed above which the minimum fin temperature may be adjusted.

The third plot from the top of FIG. 3 is a plot of ambient temperature (e.g., temperature outside the vehicle). The Y axis represents ambient temperature and ambient temperature increases in the direction of the Y axis arrow. The X axis represents time and time increases from the left side of FIG. 3 to the right side of FIG. 3. Horizontal line 301 represents a threshold temperature below which the minimum fin temperature may be adjusted.

The fourth plot from the top of FIG. 3 is a plot of the minimum outside heat exchanger freeze temperature for estimating or predicting the presence or absence of evaporator fin freezing. The Y axis represents minimum fin temperature and the minimum fin temperature increases in the direction of the Y axis arrow. The X axis represents time and time increases from the left side of FIG. 3 to the right side of FIG. 3.

The fifth plot from the top of FIG. 3 is a plot of an evaporator freezing flag state. The evaporator freezing state indicates that evaporator fin freezing may be present when the trace is at a higher level near the Y axis arrow. The evaporator freezing state indicates that the possibility of evaporator freezing is low when the evaporator freezing state is near the X axis. The X axis represents time and time increases from the left side of FIG. 3 to the right side of FIG. 3.

At time T0, the grille shutters are closed and vehicle speed is at a lower level. The ambient temperature is also low and the minimum outside heat exchanger freeze temperature is low. By adjusting the minimum outside heat exchanger freeze temperature to a low level 302, the evaporator freeze temperature may have be at a lower temperature before it is possible to assess the evaporator fins as being at a freezing condition. The evaporator freezing flag is not asserted. The evaporator freezing flag may be asserted when evaporator fin temperature is less than the minimum outside heat exchanger freeze temperature or when evaporator fin temperature is within a predetermined temperature of minimum outside heat exchanger freeze temperature while the evaporator fin temperature is being reduced at more than a threshold rate. The minimum outside heat exchanger freeze temperature 302 is based on the grille shutters being closed, the vehicle speed being low, and the ambient temperature being greater than threshold level 301.

At time T1, the grille shutters remain closed and vehicle speed remains at the lower level. The ambient temperature has decreased to a level less than threshold temperature 301. The ambient temperature may change during the course of the day or based in the travel path. The minimum outside heat exchanger freeze temperature is increased to level 304 in response to ambient temperature falling below temperature threshold 301. The minimum outside heat exchanger freeze temperature 304 is based on the grille shutters being closed, the vehicle speed being low, and the ambient temperature being less than threshold level 301. The evaporator freezing flag remains in a not asserted state.

At time T2, the grille shutters remain closed and vehicle speed has increased to threshold level 300. The ambient temperature remains below threshold temperature 301 and the minimum outside heat exchanger freeze temperature is increased to level 306 in response to the increase in vehicle speed exceeding threshold level 300. The minimum outside heat exchanger freeze temperature 306 is based on the grille shutters being closed, the vehicle speed being higher than threshold level 300, and the ambient temperature being less than threshold level 301. The evaporator freezing flag remains in a not asserted state.

At time T3, the grille shutters open and vehicle speed remains greater than threshold level 300. The ambient temperature remains below threshold temperature 301 and the minimum outside heat exchanger freeze temperature is increased to level 310 in response to the grille shutters opening. The evaporator freezing flag remains in a not asserted state. The evaporator freezing flag is not asserted since the evaporator fin temperature (not shown) is not less than the minimum outside heat exchanger freeze temperature nor is the evaporator fin temperature within a predetermined temperature of the minimum outside heat exchanger freeze temperature while the evaporator fin temperature is being reduced at more than a threshold rate. The minimum outside heat exchanger freeze temperature 310 is based on the grille shutters being open, the vehicle speed being higher than threshold level 300, and the ambient temperature being less than threshold level 301.

At time T4, the grille shutters remain open and vehicle speed remains greater than threshold level 300. The ambient temperature remains below threshold temperature 301 and the minimum outside heat exchanger freeze temperature remains constant. The evaporator freezing flag is now asserted indicating that evaporator freezing may be present. The evaporator freezing flag is asserted since the evaporator fin temperature (not shown) is less than the minimum outside heat exchanger freeze temperature or the evaporator fin temperature is within a predetermined temperature of minimum outside heat exchanger freeze temperature while the evaporator fin temperature is being reduced at more than a threshold rate. Mitigating actions may be taken when the evaporator freezing flag is asserted. For example, the heat pump may change from a heating mode to a de-icing mode.

At time T5, the grille shutters remain open and vehicle speed remains greater than threshold level 300. The ambient temperature remains below threshold temperature 301 and the minimum outside heat exchanger freeze temperature is reduced. The evaporator freezing flag is transitioned from an asserted state to a not asserted state indicating that evaporator freezing is not expected at present conditions. The evaporator freezing flag is not asserted since the evaporator fin temperature (not shown) is not less than the minimum outside heat exchanger freeze temperature nor is the evaporator fin temperature within a predetermined temperature of minimum outside heat exchanger freeze temperature while the evaporator fin temperature is being reduced at more than a threshold rate. Therefore, the mitigating actions to reduce evaporator freezing may be ceased.

At time T6, the grille shutters close and vehicle speed remains greater than threshold level 300. The ambient temperature remains below threshold temperature 301 and the minimum outside heat exchanger freeze temperature is decreased in response to the grille shutters closing. The evaporator freezing flag remains in a not asserted state. The evaporator freezing flag is not asserted since the evaporator fin temperature (not shown) is not less than the minimum outside heat exchanger freeze temperature nor is the evaporator fin temperature within a predetermined temperature of minimum outside heat exchanger freeze temperature while the evaporator fin temperature is being reduced at more than a threshold rate.

At time T7, the grille shutters remain closed and vehicle speed has decreased to less than threshold level 300. The ambient temperature remains below threshold temperature 301 and the minimum outside heat exchanger freeze temperature is decreased in response to the decrease in vehicle speed being less than threshold level 300. The evaporator fin freezing flag remains in a not asserted state.

Thus, the sequence of FIG. 3 visually shows how the minimum outside heat exchanger freeze temperature may be adjusted in response to changes in vehicle conditions. Further, although the minimum outside heat exchanger freeze temperature changes, the evaporator freeze flag is not automatically asserted.

Referring now to FIG. 4, a flowchart of a method for operating a vehicle climate control system is shown. The method of FIG. 4 may be included in the system of FIGS. 1 and 2 as executable instructions stored in non-transitory memory. Further, the method of FIG. 4 may provide the operating sequence shown in FIG. 3.

At 402, method 400 adjusts or sets the outside evaporator freeze risk variable to indicate a low possibility of evaporator freezing. In one example, the outside evaporator freeze risk variable may be a bit having a value of zero when the possibility of evaporator freezing is low. Method 400 proceeds to 404 after the outside evaporator freeze risk variable is adjusted to indicate a low possibility of evaporator freezing.

At 404, method 400 judges whether or not the vapor compression heat pump is in a cooling, de-icing, or off mode. In one example, the operating state of the vapor compression heat pump may be indicated by a value of a variable stored in memory. If method 400 judges that the vapor compression heat pump is in cooling, de-icing, or off mode, the answer is yes and method 400 proceeds to 430. Otherwise, the answer is no and method 400 proceeds to 408.

At 408, method 400 judges whether or not grille shutters are open. In one example, a bit in memory takes on a value of zero if grille shutters are closed and a value of one if grille shutters are open. In other examples, the variable may take on a value between two extreme values (e.g., zero and one, or zero and one hundred) to indicate the grille shutters are fully open, fully closed, or partially open. If method 400 determines that the grille shutters are open or partially open, the answer is yes and method 400 proceeds to 410. Otherwise, the answer is no and method 400 proceeds to 412.

At 410, method 400 adjusts a value of variable T_OHX_FIN_MIN (e.g., minimum outside heat exchanger freeze temperature) to a first temperature value. The first temperature value may increase the minimum outside heat exchanger freeze temperature so that when the evaporator fin temperature is compared to the minimum outside heat exchanger freeze temperature, a freezing evaporator fin condition may be indicated at a higher evaporator fin temperature. The variable T_OHX_FIN_MIN may be determined to a single predetermined value, or alternatively, the value of variable T_OHX_FIN_MIN may vary as grille shutter opening amount varies. Method 400 proceeds to 422 after the value of T_OHX_FIN_MIN is adjusted.

At 412, method 400 judges whether or not vehicle speed is greater than (G.T.) a threshold vehicle speed. In one example, a byte or word in memory takes on a value of zero if vehicle speed is less than the threshold speed and a value of one if vehicle speed is greater than the threshold speed. In other examples, the variable may take on a value between two extreme values (e.g., zero and one, or zero and one hundred) to indicate the exact vehicle speed. If method 400 determines that vehicle speed is greater than the threshold vehicle speed, the answer is yes and method 400 proceeds to 414. Otherwise, the answer is no and method 400 proceeds to 416.

At 414, method 400 adjusts a value of variable T_OHX_FIN_MIN (e.g., minimum outside heat exchanger freeze temperature) to a second temperature value. The second temperature value may be less than the first temperature value described at 410. The second temperature value may increase the minimum outside heat exchanger freeze temperature so that when the evaporator fin temperature is compared to the minimum outside heat exchanger freeze temperature, a freezing evaporator fin condition may be indicated at a higher evaporator fin temperature. The variable T_OHX_FIN_MIN may be determined to a single predetermined value, or alternatively, the value of variable T_OHX_FIN_MIN may vary as vehicle speed varies. Method 400 proceeds to 422 after the value of T_OHX_FIN_MIN is adjusted.

At 416, method 400 judges whether or not ambient temperature is less than (L.T.) a predetermined threshold temperature. In one example, a byte or word in memory takes on a value of one if ambient temperature is less than the threshold ambient temperature and a value of zero if ambient temperature is greater than the threshold ambient temperature. In other examples, the variable may take on a value between two extreme values (e.g., zero and one, or zero and one hundred) to indicate the exact ambient temperature. If method 400 determines that ambient temperature is less than the threshold ambient temperature, the answer is yes and method 400 proceeds to 418. Otherwise, the answer is no and method 400 proceeds to 420.

At 418, method 400 adjusts a value of variable T_OHX_FIN_MIN (e.g., minimum outside heat exchanger freeze temperature) to a third temperature value. The third temperature value may be less than the first and second temperature values described at 410 and 414. The third temperature value may increase the minimum outside heat exchanger freeze temperature so that when the evaporator fin temperature is compared to the minimum outside heat exchanger freeze temperature, a freezing evaporator fin condition may be indicated at a higher evaporator fin temperature. The variable T_OHX_FIN_MIN may be determined to a single predetermined value, or alternatively, the value of variable T_OHX_FIN_MIN may vary as ambient temperature varies. Method 400 proceeds to 422 after the value of T_OHX_FIN_MIN is adjusted.

At 420, method 400 adjusts a value of variable T_OHX_FIN_MIN (e.g., minimum outside heat exchanger freeze temperature) to a fourth temperature value. The fourth temperature value may be less than the first, second, and third temperature values described at 410, 414, and 418. The fourth temperature value may increase the minimum outside heat exchanger freeze temperature so that when the evaporator fin temperature is compared to the minimum outside heat exchanger freeze temperature, a freezing evaporator fin condition may be indicated at a higher evaporator fin temperature. The variable T_OHX_FIN_MIN is a single predetermined value. Method 400 proceeds to 422 after the value of T_OHX_FIN_MIN is adjusted.

At 422, method 400 judges whether or not evaporator fin temperature is less than the minimum outside heat exchanger freeze temperature T_OHX_FIN_MIN or if the evaporator fin temperature is within a predetermined temperature of T_OHX_FIN_MIN and the rate of decrease in evaporator fin temperature is greater than a threshold rate. If method 400 judges that evaporator fin temperature is less than the minimum outside heat exchanger freeze temperature T_OHX_FIN_MIN or if the evaporator fin temperature is within a predetermined temperature of T_OHX_FIN_MIN and the rate of decrease in evaporator fin temperature is greater than a threshold rate, the answer is yes and method 400 proceeds to 424. Otherwise, the answer is no and method 400 proceeds to 430.

At 424, method 400 sets the state of the outside heat exchanger freeze risk variable to indicate freezing risk is high. In one example, the outside heat exchanger freeze risk variable is a bit that is set to a value of one when the freezing risk is high. Method 400 proceeds to 426 after the outside heat exchanger freeze risk variable is set to indicate a high level of freezing risk.

At 426, method 400 performs one or more mitigating actions in response to the outside heat exchanger freezing risk being at a high level. In some examples, heat pump subsystem 232 ceases to operate in heating or dehumidification modes. In one example, method 400 exits heating mode and enters de-icing mode via partially opening expansion device 264 and deactivating coolant pump 254 if the cabin temperature is within a predetermined temperature of the desired cabin temperature. If PTC heaters are available, the PTC heaters may be activated to heat the passenger cabin. In still other examples, the engine may be started to provide heat to the cabin when the cabin temperature is not near the desired cabin temperature. Method 400 proceeds to exit after mitigating actions are taken.

At 430, any mitigating actions taken at 426 are cancelled or ceased. In some examples, the mitigating actions may be ceased in response to evaporator fin temperature increasing above the minimum outside heat exchanger temperature. Method 400 proceeds to exit after mitigating actions are cancelled.

Thus, method 400 provides for operating a vehicle climate control system, comprising: adjusting a temperature threshold in response to a position of grille shutters; judging whether or not evaporator fins are expected to freeze in response to the position of grille shutters; and performing an action to reduce a possibility of the evaporator fins freezing. The method includes where the action includes entering a de-icing mode. The method includes where the temperature threshold is increased when the position of grille shutters indicates that the grille shutters are open. The method includes where the temperature threshold is decreased when the position of grille shutters indicates that the grille shutters are closed. The method further comprises comparing an evaporator fin temperature to the threshold temperature. The method includes where the action is performed if the evaporator fin temperature is less than the temperature threshold. The method further comprises not performing the action if the evaporator fin temperature is greater than the temperature threshold.

The method of FIG. 4 also provides for operating a vehicle climate control system, comprising: adjusting a temperature threshold in response to a position of grille shutters and a vehicle speed; judging whether or not evaporator fins are expected to freeze in response to the position of grille shutters and the vehicle speed; and performing an action to reduce a possibility of evaporator fin freezing. The method includes where the temperature threshold is increased if the grille shutters are open and further increased if the vehicle speed is greater than a threshold speed. The method includes where the temperature threshold is decreased if the grille shutters are closed and the temperature threshold is further decreased if the vehicle speed is less than a threshold speed. The method includes where the action is adjusting a state of one or more valves to change a heat pump operating mode. The method includes where the heat pump operating mode is changed to a de-icing mode. The method includes where the action is reducing the opening amount of grille shutters. The method also includes where the action is adjusting a position of an expansion valve.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, vehicles including electric, hybrid, or internal combustion engine propulsion systems could use the present description to advantage.

The invention claimed is:

1. A method for operating a vehicle climate control system, comprising:
    adjusting a temperature threshold in response to a position of grille shutters;
    judging that evaporator fins are expected to freeze in response to a temperature of the evaporator fins being below the temperature threshold;
    performing an action to reduce a possibility of the evaporator fins freezing in response to the evaporator fins being expected to freeze; and
    adjusting the temperature threshold in response to a vehicle speed and in response to an ambient temperature, the adjustment in response to the position of the grille shutters being a larger adjustment than the adjustment in response to the vehicle speed, and the adjustment in response to the vehicle speed being a larger adjustment than the adjustment in response to the ambient temperature.

2. The method of claim 1, where the action includes entering a de-icing mode.

3. The method of claim 1, where the temperature threshold is increased when the position of the grille shutters indicates that the grille shutters are open.

4. The method of claim 1, where the temperature threshold is decreased when the position of the grille shutters indicates that the grille shutters are closed.

5. The method of claim 1, further comprising not performing the action if the temperature of the evaporator fins is greater than the temperature threshold.

6. A method for operating a vehicle climate control system, comprising:
    adjusting an outside heat exchanger freeze temperature threshold in response to a change in each of a position of grille shutters and a vehicle speed;
    judging whether or not evaporator fins are expected to freeze based on the outside heat exchanger freeze temperature threshold; and
    performing an action to reduce a possibility of evaporator fin freezing based on the judging.

7. The method of claim 6, where the outside heat exchanger freeze temperature threshold is increased if the grille shutters are opened and further increased if the vehicle speed is greater than a threshold speed.

8. The method of claim 6, where the outside heat exchanger freeze temperature threshold is decreased if the grille shutters are closed and further decreased if the vehicle speed is less than a threshold speed.

9. The method of claim 6, where the action is adjusting a state of one or more valves to change a heat pump operating mode.

10. The method of claim 9, where the heat pump operating mode is changed to a de-icing mode.

11. The method of claim 6, where the action is reducing an opening amount of the grille shutters.

12. The method of claim 6, where the action is adjusting a position of an expansion valve.

13. The method of claim 6, wherein the adjustment in response to the position of the grille shutters is a larger adjustment than the adjustment in response to the vehicle speed.

14. A vehicle system, comprising:
an evaporator including evaporator fins;
a compressor in fluidic communication with the evaporator;
a condenser in fluidic communication with the evaporator and the compressor;
grille shutters; and
a controller including executable instructions stored in non-transitory memory for:
adjusting a temperature threshold in response to a grille shutter position of the grille shutters,
in response to a temperature of the evaporator fins being within a predetermined temperature of the temperature threshold and a rate of change of the temperature of the evaporator fins exceeding a threshold rate of change, performing an action to reduce a possibility of evaporator fin freezing; and
adjusting the temperature threshold in response to ambient temperature, where the adjustment based on the grille shutter position is a larger adjustment than the adjustment in response to the ambient temperature.

15. The vehicle system of claim 14, further comprising additional instructions for closing the grille shutters in response to the temperature of the evaporator fins being less than the temperature threshold.

16. The vehicle system of claim 14, further comprising additional instructions to adjust the grille shutter position of the grille shutters in response to a comparison of the temperature of the evaporator fins and the temperature threshold.

17. The vehicle system of claim 14, further comprising additional instructions to adjust an operating state of an expansion valve, the expansion valve in fluidic communication with the evaporator.

* * * * *